(12) United States Patent
Thollot et al.

(10) Patent No.: US 8,374,990 B2
(45) Date of Patent: Feb. 12, 2013

(54) SITUATIONAL RESOURCE RATING

(75) Inventors: Raphaël Thollot, Levallois-Perret (FR);
Jean-Yves Cras, Paris (FR);
Marie-Aude Aufaure,
Chatenay-Malabry (FR)

(73) Assignee: Business Objects Software Limited,
Dublin (IE)

(*) Notice: Subject to any disclaimer, the term of this patent is extended or adjusted under 35 U.S.C. 154(b) by 610 days.

(21) Appl. No.: 12/618,271

(22) Filed: Nov. 13, 2009

(65) Prior Publication Data

US 2010/0312746 A1 Dec. 9, 2010

Related U.S. Application Data

(60) Provisional application No. 61/184,996, filed on Jun. 8, 2009.

(51) Int. Cl.
*G06F 17/00* (2006.01)
*G06N 7/04* (2006.01)
(52) U.S. Cl. ............................ 706/54; 707/732; 709/224
(58) Field of Classification Search ...................... 706/54
See application file for complete search history.

(56) References Cited

U.S. PATENT DOCUMENTS

2007/0106651 A1* 5/2007 Isaacson et al. ................... 707/3
2008/0114756 A1* 5/2008 Konig et al. ....................... 707/5

OTHER PUBLICATIONS

Huanhuan Cao et al., "Context-Aware Query Suggestion by Mining Click-Through and Session Data", KDD'08, Aug. 24-27, 2008, Las Vegas, Nevada, ACM 978-1-60558-193, pp. 875-883, total 9pgs.).

Sven Schwarz, "A Context Model for Personal Knowledge Management Applications", in T.R. Roth-Berghofer, S. Schulz, and D.B. Leake (Eds.), Lecture Notes in Computer Science, vol. 3946, pp. 18-33, 2006, ISSN:0302-9743, 16pgs.

Zeina Jrad et al., "A Contextual User Model for Web Personalization", Web Information Systems Engineering—WISE 2007 Workshops, 2007, retrieved date Nov. 29, 2012, download from http://link.springer.com/chapter/10.1007%2F978-3-540-77010-7_33?LI=true, 5pgs.

Tao Gu et al., "A Middleware for Building Context-Aware Mobile Services", 2004, In Vehicular Technology Conference, VTC 2004-Spring. 2004 IEEE 59th, Vo. 5, pp. 2656-2660, 5pgs.

Kaiyu Wan et al., "An Architecture for Developing Context-aware Systems", in T.R. Roth-Berghofer, S. Schulz, and D. B. Leake (Eds.), Lecture Notes in Computer Science, vol. 3946, pp. 119-123, 2006, ISSN:0302-9743, 5pgs.

Harry Chen et al., "An Intelligent Broker for Context-Aware Systems", Adjunct Proceedings of Ubicomp, vol. 3, 2003, pp. 183-184, 2pgs.

(Continued)

*Primary Examiner* — Kakali Chaki
*Assistant Examiner* — Kalpana Bharadwaj
(74) *Attorney, Agent, or Firm* — Buckley, Maschoff & Talwalkar LLC

(57) ABSTRACT

A computer-implemented system may include determination of a similarity of a semantic projection of a set of interests of a first user to a semantic projection of a first resource, wherein the semantic projection of the set of interests of the first user and the semantic projection of the first resource conforms to a common semantic projection model. Also included may be determination of a semantic interest of the first user for the first resource in a first context based on the similarity of the semantic projection of the set of the interests of the first user to the semantic projection of the first resource, and determination of an interest measure associated with the first user, the first resource and the first context based on a rating prediction for the first user to the first resource in the first context and on the determined semantic interest of the first user for the first resource in the first context.

16 Claims, 8 Drawing Sheets

OTHER PUBLICATIONS

Tao Gu et al., "An Ontology-based Context Model in Intelligent Environments", 2004, In Proceedings of Communication Networks and Distributed Systems Modeling and Simulation Conference, vol. 2004, pp. 270-275, 6pgs.

Norbert Fuhr, "A Probability Ranking Principle for Interactive Information Retrieval", Information Retrieval, vol. 11, No. 3, Jan. 25, 2008, pp. 251-265.

David Vallet et al., "A Semantically-Enhanced Personalization Framework for Knowledge-Driven Media Services", In Proceedings of IADIS International Conference on WWW/Internet (ICWI 2005), 2005, 8pgs.

Mohamed Ramzi Haddad et al., "A User-oriented Accessibility Measure for Spatial Web Personalization", Presentation in Workshop on Geographic Information on the Internet Workshop (GIIW), Apr. 6, 2009, Toulouse, France, pp. 1-13.

Manuele Kirsh-Pinheiro et al., "Context-Aware Filtering for Collaborative Web Systems: Adapting the Awareness Information to the User's Context", In Proceedings of the 2005 ACM Symposium on Applied Computing, 2005, (pp. 1668-1673, 6 pages total).

Alfred Kobsa, "Generic User Modeling Systems", User Modeling and User-Adapted Interaction, vol. 11, No. 1, 2001, (pp. 49-63, 15 pages total).

Michael Sutterer et al., "Managing and Delivering Context-Dependent User Preferences in Ubiquitous Computing Environments", Proceedings of the 2007 International Symposium on Applications and the Internet Workshops (SAINTW'07), 2007 IEEE, pp. 1-4, 4pgs.

Alessandro Micarelli et al., "Personalized Search on the World Wide Web" in Peter Brusilovsky, Alfred Kobsa, and Wolfgang Nejdl(Eds.), 2007, The Adaptive Web, pp. 195-230, LNSC vol. 4321, ISSN:0302-9743, Springer, 36pgs.

Fang Liu et al., "Personalized Web Search for Improving Retrieval Effectiveness", Knowledge and Data Engineering, IEEE transactions on, vol. 16, No. 1, 2004, pp. 28-40.

Paul Resnick et al., "Recommender Systems", Communication of the ACM, vol. 40, No. 3, (Mar. 1997), pp. 56-58, 3pgs.

Dominik Heckmann "Situation Modeling and Smart Context Retrieval with Semantic Web Technology and Conflict Resolution", T.R. Roth-Berghofer, S. Schulz, and D.B. Leake (Eds.), Lecture Notes in Computer Science, vol. 3946, ISSN:0302-9743, 2006, 14pgs.

Oana Bucur et al., "Steps Towards Making Contextualized Decisions: How to Do What You Can, With What You Have, Where You Are", Industrial Engineering and Computer Sciences Division IG21), Research Report 2005-700-013, Sep. 2005, International Journal of Pervasive Computing and Communications, Aug. 2005, pp. 34-37, ISSN:0302-9743.

Moshen Jamali et al., "TrustWalker: A Random Walk Model for Combining Trust-based and Item-based Recommendation", In Proceedings of the 15th ACM SIGKDD International Conference on Knowledge Discovery and Data Mining (KDD'09), Jul. 28-Jul. 1, 2009, Paris, France, pp. 397-406, 9pgs.

Anind K. Day, "Understanding and Using Context", Human-Computer Interaction Institute, School of Computer Science, Jan. 1, 2001, vol. 5, No. 1, pp. 4-7.

Anders Kofod-Petersen et al., "Using Activity Theory to Model Context Awareness", In Modeling and Retrieval of Context, (2006), Springer, ISBN: 978-3-540-33587-0, pp. 1-17, 17pgs.

* cited by examiner

SITUATIONAL RESOURCE RATING

CROSS REFERENCE TO RELATED APPLICATIONS

This application claims priority to U.S. Provisional Patent Application Ser. No. 61/184,996, filed Jun. 8, 2009 and entitled "Situational Resource Rating", the contents of which are incorporated by reference herein for all purposes.

BACKGROUND

Recommendation systems attempt to provide a user with a list of relevant resources, whether it be music, movies, books, news articles, web pages, text documents, etc. Conventionally, the relevance of a resource is determined based on the user's profile and characteristics of the resource (i.e., in a content-based approach) and/or based on the user's profile and the user's social environment (i.e., in a collaborative filtering approach).

Recommendation systems can be used to excise non-relevant resources from the aforementioned list, and/or to order the list according to a relevancy determined for each resource. The determined relevancy of a resource is sometimes construed as a prediction of a rating which the user would give to the resource.

A user's profile typically includes information collected both explicitly from the user and implicitly (i.e., without any direct action from the user). The profile may provide a representation of the user's interests, beliefs, goals, situation, etc. The profile may evolve based on newly-collected information, such as user purchases and resource ratings provided by the user.

Google provides two examples of recommendation systems which are primarily content-based. Google Reader is a Real Simple Syndication (RSS) reader that allows users to subscribe to RSS feeds and to read articles within the feeds. Google Reader recommends feeds to a user based on the feeds to which the user has already subscribed, the content of articles associated with the subscribed-to feeds, and the articles actually read by the user. Google Ad Sense, on the other hand, suggests advertisements to a user based on the content of a piece of text (i.e., a search query) input by the user.

Amazon.com uses collaborative filtering to recommend items to a user based on items previously purchased by the user. The recommended items include items purchased by other users who also purchased one of the user's previously-purchased items. The suggested items may be filtered further based on ratings thereof provided by the other users.

Conventional user profiles fail to sufficiently capture spontaneous interests or current user actions that do not necessarily correspond to the user's usual focus. Accordingly, recommendations provided by recommendation systems which employ user profiles do not reflect these spontaneous interests or current user actions.

Also, some conventional recommendation systems (e.g., collaborative filtering systems) may base their recommendations on similarity measures which quantify similarities between users or resources. However, these similarity measures do not take into account a context in which resources will be suggested to a user. In other words, the similarity measures reflect an absolute similarity irrespective of the context of the users and/or the context in which the resources will be recommended.

Recommendation systems are desired which may account for a user's situational context and that can be applied to significantly heterogeneous resources. Such a system may introduce a new measure of the interest of a user for a given resource in a given context.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
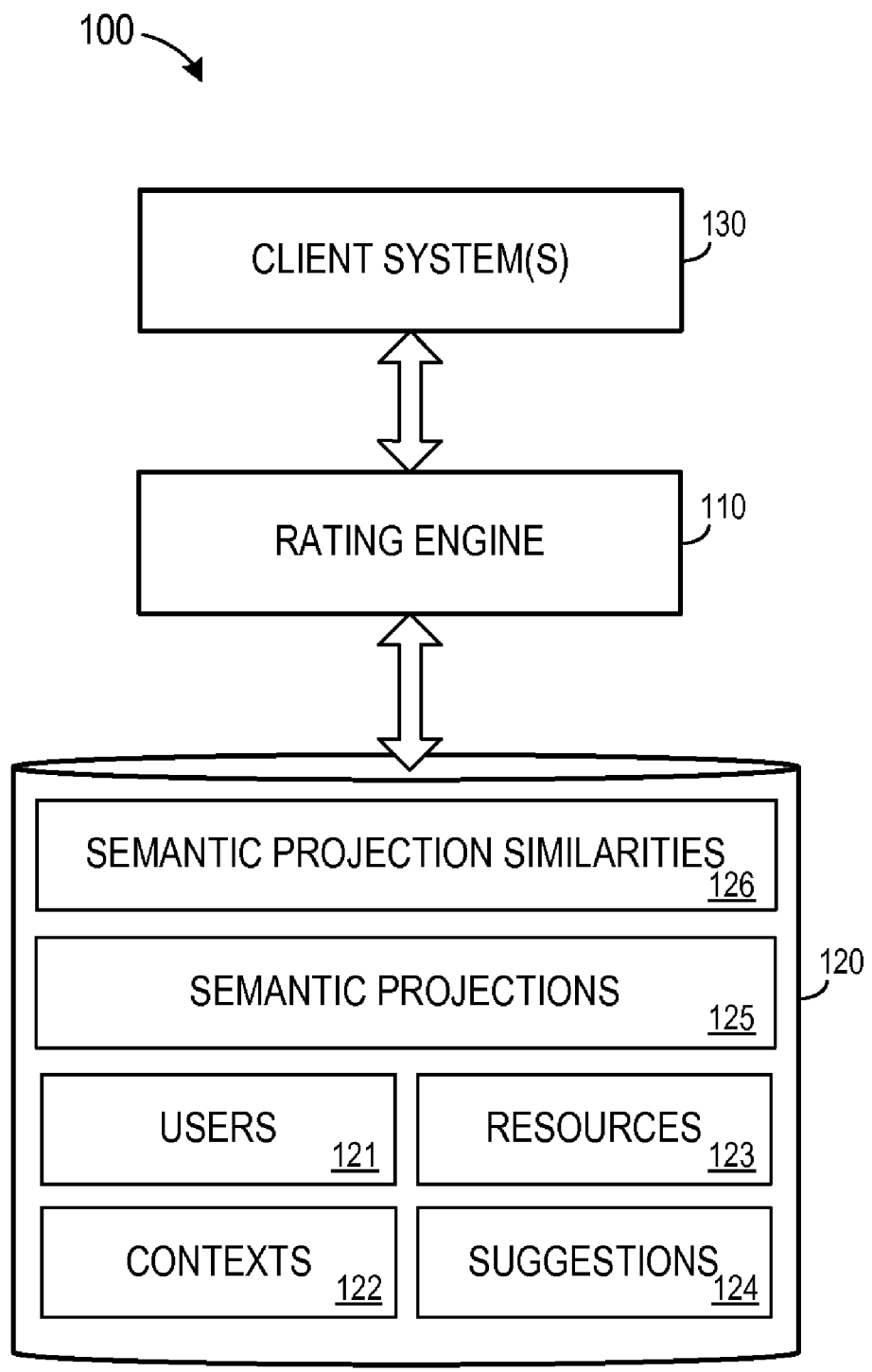
FIG. 1 is a block diagram of a system according to some embodiments.

System 100 of FIG. 1 comprises an architecture to determine an interest measure associated with a given user and a given resource in a given context according to some embodiments. System 100 includes rating engine 110, storage device 120 and client system(s) 130. Embodiments are not limited to the architecture of system 100.

Rating engine 110 may comprise a computer processor and hardware configured to execute one or more of the processes described herein. Rating engine 110 may also or alternatively comprise program code stored on a tangible medium and executable by a processor to perform one or more of the processes described herein. In some embodiments, rating engine 110 may receive an indication of a user, a resource and a context from client system(s) 130 and may determine an interest measure corresponding thereto.

Client device(s) 130 may comprise any combination of devices and systems to request an interest measure associated with a user, a resource and a context. Generally, client device(s) 130 may comprise any system(s) which are capable of determining one or more resources of potential interest to a user, but which require quantification of the user's respective level of interest in each of the one or more resources. Examples of client device(s) 130 include, but are not limited to, a search engine, a shopping engine, a Web server, and a recommendation engine.

Figure 2:
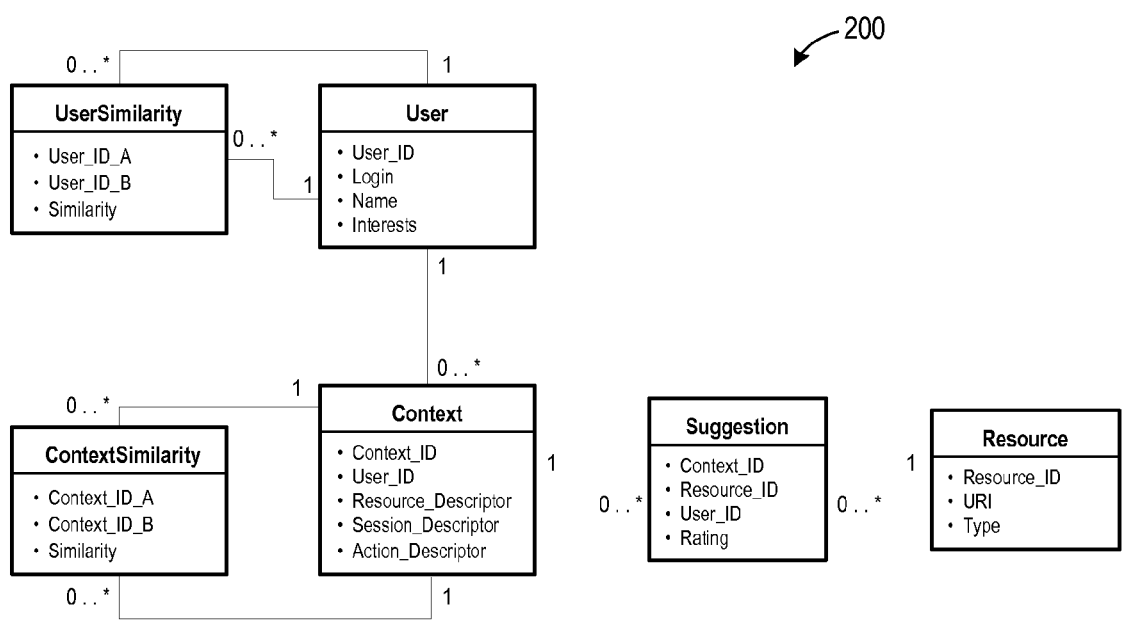
FIG. 2 is a data model according to some embodiments.

Storage device 120 stores data used by rating engine 110 to determine an interest measure according to some embodiments. Storage device 120 stores data describing users 121, contexts 122, resources 123, and suggestions 124. FIG. 2 illustrates simple data model 200 which may govern this data according to some embodiments. Each entity of data model 200 may include members different from or in addition to those illustrated. A data model according to some embodiments may also include entities different from or in addition to the entities of data model 200.

Users 121 are represented by User entities. A User entity specifies a user's interests, which may be represented as a list of weighted keywords in some embodiments. Some embodiments may link the user entity to an existing user server or user profile component.

Contexts 122 are stored as Context entities linked to a User entity. Any number of contexts can be stored for each user, and a given context is associated with only one user. A Context entity of data model 200 includes an action descriptor, a session descriptor, and a resource descriptor.

For a given Context entity, the action descriptor represents an action which a user identified in the entity intends to execute. The action descriptor can be sub-classed to represent increasingly precise intentions. Examples of actions include, but are not limited to, "Create a presentation", "Analyze our revenue by country", etc.

The session descriptor is to describe the current situation of the user. The situation may be represented by any number of subclasses, non-exhaustive examples of which include location, time, type of user device, currently-used application, etc. The resource descriptor describes the data universe in which the user is participating (i.e., the data to which the user is allowed access).

Resources 123 may comprise data describing any resource which may be of use to a user. Examples include a web page, a query, a dataset, a music file, a video file, etc. A Resource entity of data model 200 represents resources by a type and a Uniform Resource Identifier, but embodiments are not limited thereto.

Suggestions 124 are represented by Suggestion entities of data model 200. A Suggestion entity links a suggested resource to a user and to the context in which the resource was suggested. The Suggestion entity also stores a rating which the user has assigned to the suggestion.

The above-described elements may provide a history of resources which were suggested to a given user and of the contexts in which those resources were suggested. This history may be leveraged to compute a measure of a user's interest for a given resource in a given context, and to provide improved recommendations based thereon. Specific processes for doing so and according to some embodiments are described below.

Embodiments may utilize a common semantic projection model to create semantic projections 125 of users and resources. Semantic projections 125 may also include semantic projections of contexts based on the common semantic projection model. The common semantic projection model may facilitate the determination of similarities between users, between resources, and between contexts. For example, a first semantic projection may be created for a first user and a second semantic projection may be created for a second user based on the common semantic projection model. A similarity between the two users may then be determined simply by determining a similarity between the first semantic projection and the second semantic projection.

Advantageously, use of a common semantic projection model may also facilitate the determination of similarity between a user and a resource. More specifically, similarity between a user and a resource may be determined by determining a similarity between a semantic projection of the user and a semantic projection of the resource, where both semantic projections conform to a common semantic projection model.

A semantic projection may consist of a set of weighted concepts specified by a common semantic projection model. The weighted concepts may represent the content of a text document, a user's interests, a query, etc. Accordingly, one user, resource or context may have the same semantic projection as another user, resource or context.

Figure 3:
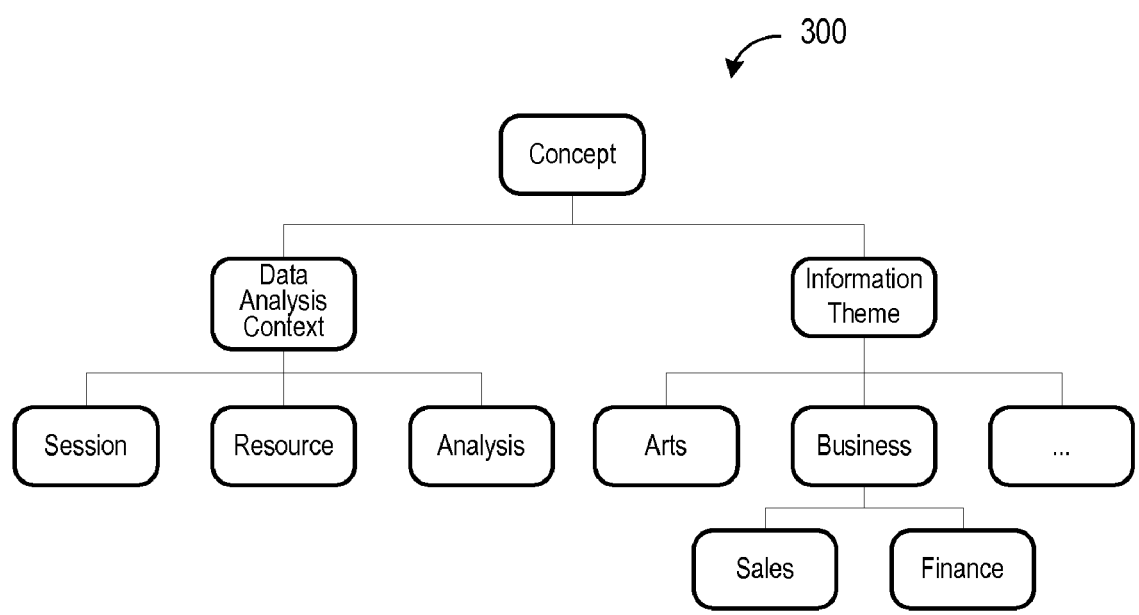
FIG. 3 illustrates concepts of a semantic projection model according to some embodiments.
Figure 4:
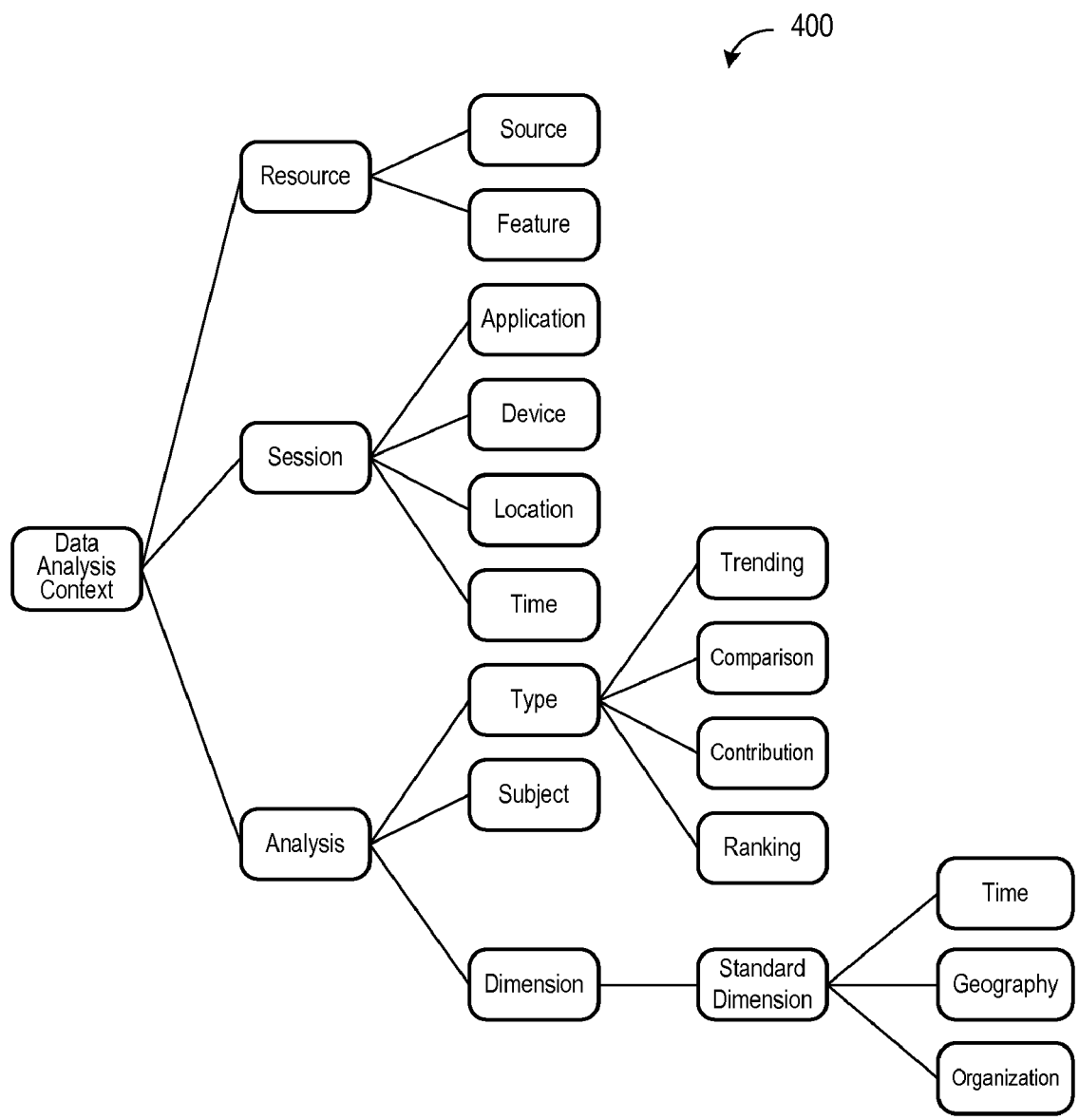
FIG. 4 illustrates concepts of a semantic projection model according to some embodiments.

FIG. 3 illustrates common semantic projection model 300 according to some embodiments. Model 300 includes concepts organized in a hierarchical tree structure. Concepts may represent context elements such as those described above, information themes (e.g., "sales", "music", "mountain", etc), or any other type of information. Embodiments are not limited to the type or number of concepts shown in model 300. Model portion 400 of FIG. 4 illustrates additional concepts which may branch from the three previously-described data analysis context concepts.

Since a semantic projection is a set of weighted concepts taken from the concepts of a common semantic projection model, the semantic projection of an object O including two concepts "sales" and "time" could be represented as:

$$\pi_{sem}(O) = \{(Sales, 2); (Time, 1)\}.$$

Semantic projection similarities 126 indicate the similarities between pairs of semantic projections 125. A similarity may be represented by a value between 0 and 1 which indicates how similar two sets of weighted concepts (i.e., semantic projections) are to one another. Data model 200 provides UserSimilarity and ContextSimilarity entities to store pre-computed similarities between users and contexts, respectively, for use during run-time as described below. According to some embodiments, similarities between semantic projections are based on the hierarchical structure of the common semantic projection model from which they are derived. With reference to FIG. 4, the concepts "time" and "geography" are not identical but are somewhat similar since they share a common parent concept: "standard dimension".

In the following description, $I_{sem}(U, R, \sigma)$ represents the semantic interest of a user U for a resource R in a context $\sigma$. $I_{sem}(U, R, \sigma)$ may be determined based on a similarity between a semantic projection of the user U's interests ($I_U$) and a semantic projection of the resource R. This similarity may be denoted as: $sim_{sem}(\pi_{sem}(I_U), \pi_{sem}(R))$.

A rating prediction $P(U, R, \sigma)$ is a prediction of a rating which would be assigned by a user U to a resource R in a context $\sigma$. In some embodiments, an interest measure $I(U, R, \sigma)$ of a user U for a resource R in a context $\sigma$ is a function of $I_{sem}(U, R, \sigma)$ and $P(U, R, \sigma)$. Stated symbolically:

$$I(U, R, \sigma) = f(I_{sem}(U, R, \sigma), P(U, R, \sigma))$$

The rating prediction $P(U, R, \sigma)$ may take into account not only actual ratings previously assigned by the user U to a resource R in a context $\sigma$, but also suggestions of the same resource R in similar contexts $\sigma'$. Accordingly, the previously-computed context similarities may be used to retrieve a set a contexts $\sigma'$ which are suitably similar to the context $\sigma$. In a simple embodiment based on relational tables, similar contexts $\sigma'$ are retrieved from similarities 126 of storage device 120 with an SQL statement:

SELECT Context.Context_ID FROM Context, ContextSimilarity
WHERE
ContextSimilarity.Context_ID=Context.Context_ID
AND ContextSimilarity.Similarity>=$K_c$,
where $K_c$ is a constant that can be determined experimentally.

In some embodiments, determination of the interest measure $I(U, R, \sigma)$ also considers the average rating prediction for users in the community of the user U for the resource R in the context $\sigma$, denoted $P_{comm}(U, R, \sigma)$. The previously-computed context similarities may be used to retrieve a set a users U' which are suitably similar to the user U. The set of users U' may be retrieved from similarities 126 of storage device 120 with the SQL statement:

SELECT User.User_ID FROM User, UserSimilarity
WHERE UserSimilarity.User_ID=User.User_ID
AND UserSimilarity.Similarity>=$K_u$.

The predicted rating P(U', R, σ) is computed for each user U' in the set and an average community rating $P_{comm}$(U, R, σ) is determined as the average of each predicted rating P(U', R, σ). According to the foregoing embodiments:

$$I(U,R,\sigma)=f(I_{sem}(U,R,\sigma),P(U,R,\sigma),P_{comm}(U,R,\sigma))$$

Each of $I_{sem}$(U, R, σ), P(U, R, σ), and $P_{comm}$(U, R, σ) may be computed in any suitable manner according to some embodiments. Non-exhaustive examples of such computations are provided below.

Figure 5:
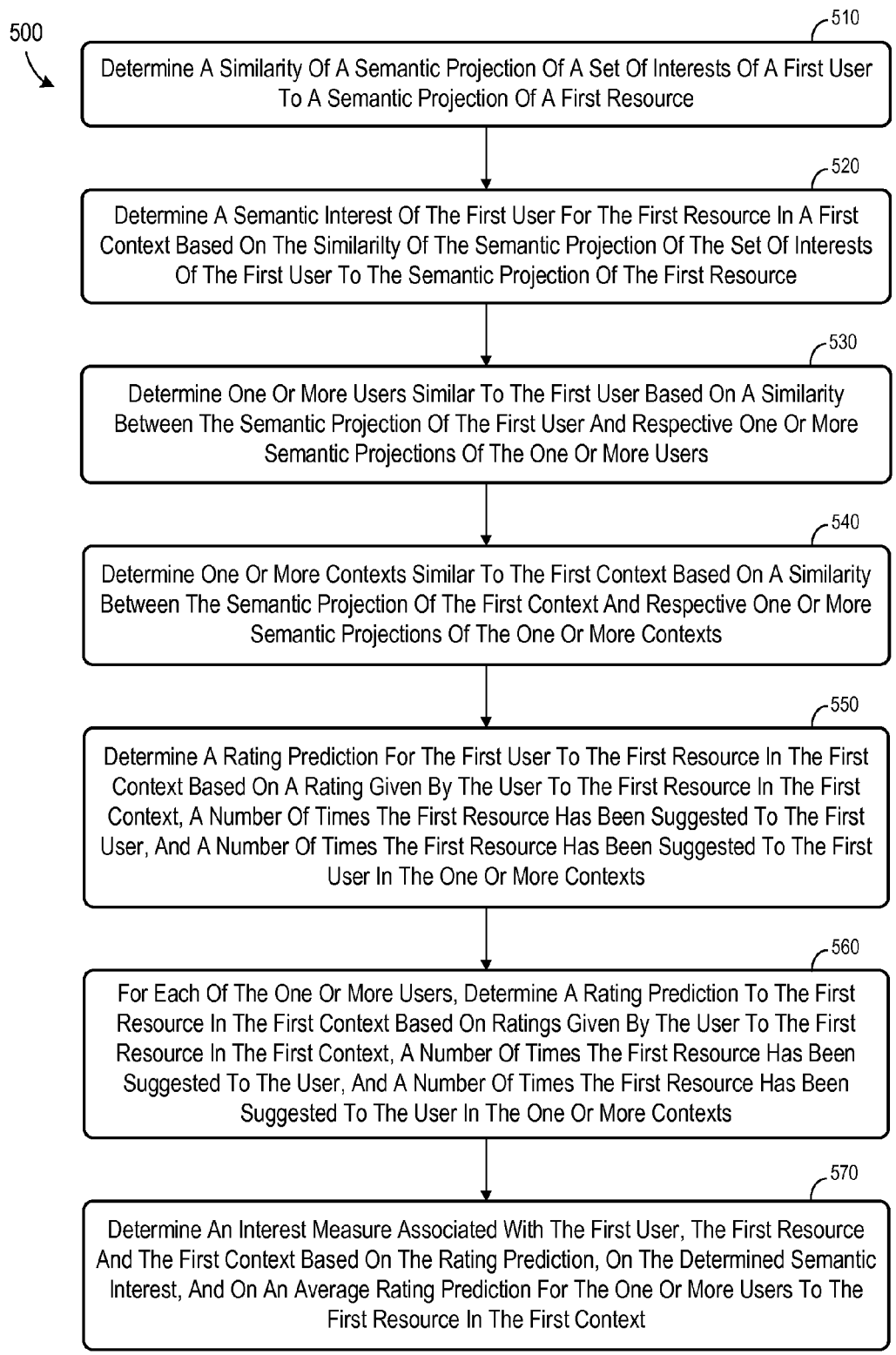
FIG. 5 is a flow diagram of a process according to some embodiments.

In this regard, FIG. 5 is a flow diagram of process steps 500 to determine an interest measure according to some embodiments. As described above, the interest measure may indicate an interest of a given user for a given resource in a given context.

Embodiments are not limited to process 500 or to the particular formulas used to described examples of process 500. Process 500 may be implemented by rating engine such as rating engine 110. In this regard, process 500 may be embodied in computer-executable program code stored on a tangible computer-readable medium. Process 500 may be implemented by any combination of hardware and/or software.

Initially, at 510, a similarity is determined between a semantic projection of a set of interests of a first user ($\pi_{sem}$($I_U$)) and a semantic projection of a first resource ($\pi_{sem}$(R)). Each semantic projection conforms to a common semantic projection model. As mentioned above, the similarity may be denoted as: $sim_{sem}(\pi_{sem}(I_U),\pi_{sem}(R))$.

Figure 6:
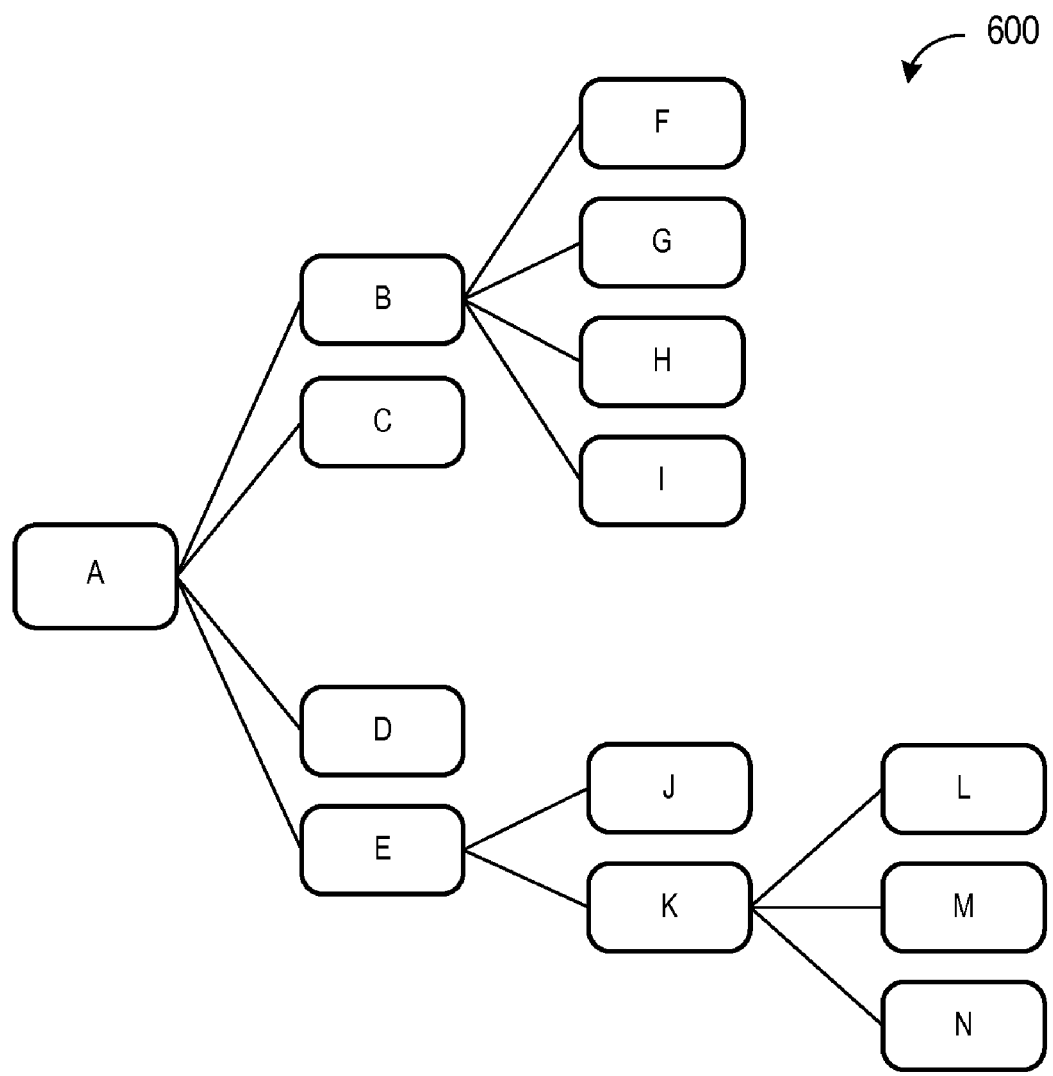
FIG. 6 illustrates a semantic projection model according to some embodiments.

FIG. 6 illustrates common semantic projection model 600 for describing a similarity determination according to some embodiments. Model 600 includes concepts A through N, each of which may represent any suitable concept. It will be assumed that semantic projections 125 include the following semantic projection ($S_1$) of a set of interests of a first user which conforms to common semantic projection model 600, and the following semantic projection ($S_2$) of a first resource which conforms to common semantic projection model 600:

| User interests - $S_1$ | Resource R - $S_2$ |
|---|---|
| Concept F, weight 0.25 | Concept G, weight 0.25 |
| Concept G, weight 0.25 | Concept H, weight 0.5 |
| Concept M, weight 0.5 | Concept J, weight 0.25 |

Figure 7A:
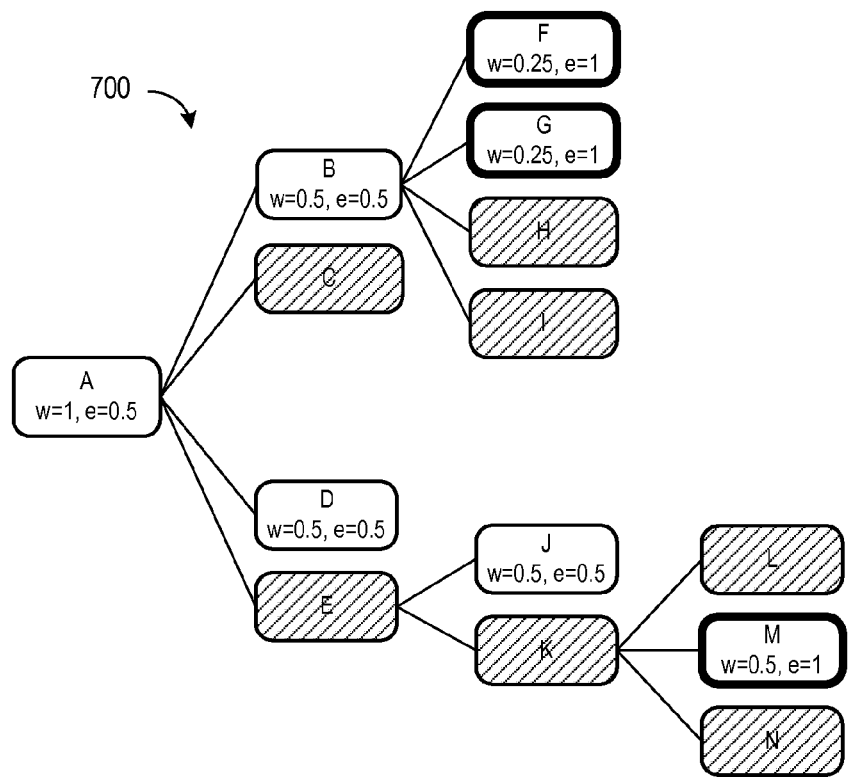
FIGS. 7A and 7B comprise semantic projections conforming to the FIG. 6 semantic projection model according to some embodiments.
Figure 7B:
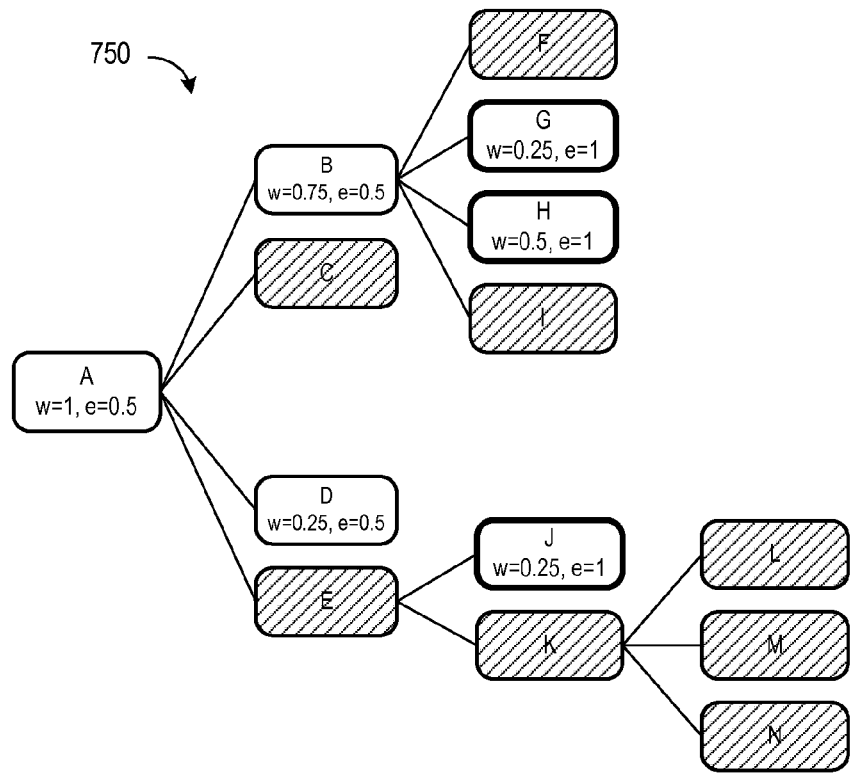

FIG. 7A and FIG. 7B illustrate, respectively, a virtual multi-level representation of the semantic projection of the set of interests of the first user (i.e., $S_1$) and a virtual multi-level representation of the semantic projection of the first resource (i.e., $S_2$). The concepts depicted with a thicker black border are those which are explicitly specified by their corresponding semantic projection. The initial weights of explicit concepts are propagated to their parent concepts, until a first common parent concept (i.e., concept A in the present example) is reached. Concepts which are not explicitly specified nor traversed during the propagation are shaded.

Accordingly, certain concepts are introduced in the multi-level representation of a semantic projection, even though these concepts were not explicitly mentioned in the semantic projection. However, it is desirable to place less importance on these "implicit" concepts than placed on explicitly-mentioned concepts. The "explicitness" of a concept is represented in the multi-level representation by a coefficient of explicitness e(C). A concept may be completely explicit (i.e., e=1), completely implicit (i.e., e=0.5) or something in between (i.e., 0.5<e<1).

For a concept C with $W_{ex}$(C) representing the explicit weight of C, and $W_{tot}$(C) representing its total weight:

$$e(C) = \frac{1 + \frac{W_{ex}(C)}{W_{tot}(C)}}{2}$$

The similarity between multi-level representations having a common parent node may be computed as a weighted average of the proximity of the different concepts' weights. For a given concept, its total weights in the two representations may be compared using the following proximity function:

$$prox(a, b) = 1 - \frac{|b - a|}{\max(a, b)}.$$

Therefore, with $w_o$(c) denoting the total weight of the concept c in the multi-level representations having a common parent node, the similarity $sim_{sem}(S_1, S_2)$ is determined by comparing the concepts of all branches stemming from and including the first common parent concept as follows:

$$sim_{sem}(S_1, S_2) |^B = \frac{\sum_{C \in T(S_1)|^B uT(S_2)|^B} e(C) \cdot depth(C) \cdot prox(w_{s1}(c), w_{s2}(c))}{\sum_{C \in T(S_1)|^B uT(S_2)|^B} e(C) \cdot depth(C)}.$$

The above similarity measure places more importance on explicitly-referenced concepts and deeper levels in the multi-level representations, since the concepts located therein may be more precise. In the latter regard, the function depth(C) provides the depth of concept C with respect to the first common parent concept. For example, depth(A)=1 and depth(L)=4.

The similarity measure generally compares the concepts of two semantic projections inside comparable branches of a multi-level representation. Inside one branch, sub-trees are built in order to compare the two semantic projections by taking into account information exposed by the structure of the multi-level representation.

The following table illustrates intermediate results of the similarity determination with respect to representations 700 and 750.

| Concept | Depth | Explicitness (e) | Weights proximity | e * Proximity * Depth | e * Depth |
|---|---|---|---|---|---|
| M | 4 | (1 + 0.5/0.5)/2 = 1 | 0 | 0 | 4 |
| F | 3 | 1 | 0 | 0 | 3 |
| G | 3 | 1 | 1 | 3 | 3 |
| H | 3 | 1 | 0 | 0 | 3 |
| J | 3 | (1 + 0.25/0.75)/2 = 0.667 | 0.5 | 1.0005 | 2.001 |

-continued

| Concept | Depth | Explicitness (e) | Weights proximity | e * Proximity * Depth | e * Depth |
|---------|-------|------------------|-------------------|-----------------------|-----------|
| B | 2 | 0.5 | 0.667 | 0.667 | 1 |
| D | 2 | 0.5 | 0.5 | 0.5 | 1 |
| A | 1 | 0.5 | 1 | 0.5 | 0.5 |
| | | | SUM | 5.6675 | 17.501 |

Therefore, $\text{sim}_{sem}(S_1, S_2) = 5.6675/17.501 = 0.323839$.

Next, at 520, a semantic interest of the first user to the first resource in a first context is determined. In some embodiments, the semantic interest $I_{sem}(U, R, \sigma)$ is simply equal to $\text{sim}_{sem}(\pi_{sem}(I_U), \pi_{sem}(R))$ (i.e., 0.323839 in the above example).

According to some embodiments, the first user's interests ($I_U$) include static aspects and dynamic (e.g., spontaneous) aspects ($I_U(\sigma)$). Accordingly, the semantic interest $I_{sem}(U, R, \sigma)$ may be a function of $\text{sim}_{sem}(\pi_{sem}(I_U), \pi_{sem}(R))$ and of $\text{sim}_{sem}(\pi_{sem}(I_U(\sigma)), \pi_{sem}(R))$. For example, in some embodiments:

$$I_{sem}(U, R, \sigma) = \frac{1}{3}\text{sim}_{sem}(\pi_{sem}(I_U), \pi_{sem}(R)) + \frac{2}{3}\text{sim}_{sem}(\pi_{sem}(I_U(\sigma)), \pi_{sem}(R))$$

Therefore, 520 may comprise determining $\text{sim}_{sem}(\pi_{sem}(I_U), \pi_{sem}(R))$ as described above and also determining $\text{sim}_{sem}(\pi_{sem}(I_U(\sigma)), \pi_{sem}(R))$. Moreover, 520 may comprise determining the semantic interest of the first user to the first resource in the first context based on $\text{sim}_{sem}(\pi_{sem}(I_U), \pi_{sem}(R))$ and $\text{sim}_{sem}(\pi_{sem}(I_U(\sigma)), \pi_{sem}(R))$.

By way of example, a scenario is considered in which previously-described semantic projections $S_1$ and $S_2$ are semantic projections of a current context and a past context, respectively.

| Current context - $S_1$ | Past context - $S_2$ |
|-------------------------|----------------------|
| Concept F, weight 0.25 | Concept G, weight 0.25 |
| Concept G, weight 0.25 | Concept H, weight 0.5 |
| Concept M, weight 0.5 | Concept J, weight 0.25 |

Static user interests ($I_U$) and dynamic user interests ($I_U(\sigma)$) are associated with the following semantic projections $S_3$ and $S_4$:

| Static user interests - $S_3$ | Dynamic user interests - $S_4$ |
|-------------------------------|--------------------------------|
| Concept G, weight 0.3 | Concept H, weight 0.4 |
| Concept H, weight 0.5 | Concept I, weight 0.4 |
| Concept I, weight 0.2 | Concept J, weight 0.2 |

Lastly, semantic projection $S_5$ of the resource R:

| Resource R - $S_5$ |
|--------------------|
| Concept G, weight 0.3 |
| Concept H, weight 0.7 |

In view of the semantic projections $S_1$-$S_5$ and the above formula for computing the semantic interest $I_{sem}(U, R, \sigma)$, 520 may comprise determining the semantic interest $I_{sem}(U, R, \sigma)$ using the following calculation:

$$I_{sem}(U, R, \sigma) = \frac{1}{3}\text{sim}_{sem}(S_3, S_5) + \frac{2}{3}\text{sim}_{sem}(S_4, S_5)$$

$\text{sim}_{sem}(S_3, S_5)$ may be determined as described above:

| Concept | Depth | Explicitness (e) | Weights proximity | e * Proximity * Depth | e * Depth |
|---------|-------|------------------|-------------------|-----------------------|-----------|
| G | 3 | 1 | 1 | 3 | 3 |
| H | 3 | 1 | 0.7143 | 2.1429 | 3 |
| I | 3 | 1 | 0 | 0 | 3 |
| B | 2 | 0.5 | 1 | 1 | 1 |
| A | 1 | 0.5 | 1 | 0.5 | 0.5 |
| | | | SUM | 6.6429 | 10.5 |

Therefore, $\text{sim}_{sem}(S_3, S_5) = 6.6429/10.5 = 0.632657$.

Similarly, $\text{sim}_{sem}(S_4, S_5)$ may be determined as described above:

| Concept | Depth | Explicitness (e) | Weights proximity | e * Proximity * Depth | e * Depth |
|---------|-------|------------------|-------------------|-----------------------|-----------|
| G | 3 | 1 | 0 | 0 | 3 |
| H | 3 | 1 | 0.57143 | 1.71429 | 3 |
| I | 3 | 1 | 0 | 0 | 3 |
| J | 3 | 1 | 0 | 0 | 3 |
| B | 2 | 0.5 | 0.8 | 0.8 | 1 |
| D | 2 | 0.5 | 0 | 0 | 1 |
| A | 1 | 0.5 | 1 | 0.5 | 0.5 |
| | | | SUM | 3.01429 | 14.5 |

Therefore, $\text{sim}_{sem}(S_4, S_5) = 3.01429/14.5 = 0.207882$, and:

$$I_{sem}(U, R, \sigma) = \frac{1}{3}(0.632657) + \frac{2}{3}(0.207882) = 0.349474$$

Returning to process 500, one or more users similar to the first user are determined at 530. The one or more users are determined based on a similarity between the semantic projection of the first user and respective one or more semantic projections of the one or more users. As described above, storage device 120 may store pre-calculated semantic projection similarities 126 according to some embodiments. These similarities 126 may specify a similarity measure for each pair of users 121. Accordingly, 530 may simply comprise identifying users sufficiently similar to the first user based on pre-calculated semantic projection similarities 126. Alternatively, 530 may comprise determining the similarities $\text{sim}_{sem}(\pi_{sem}(I_U), \pi_{sem}(I_{U'}))$ between the semantic projection of the first user U and the semantic projection of each other user U' of users 121 as described above with respect to 510, and then selecting one or more users U' associated with similarities exceeding a predetermined threshold.

540 may proceed similarly to 530. In this regard, one or more contexts similar to the first context are determined based on a similarity between the semantic projection of the first context and respective one or more semantic projections of the one or more contexts. Similarities 126 may specify a similarity measure for each pair of contexts 122. 540 may therefore comprise identifying contexts sufficiently similar to the first context based on pre-calculated semantic projection similarities 126. 540 may, on the other hand, comprise determining the similarities $sim_{sem}(\pi_{sem}(\sigma), \pi_{sem}(\sigma'))$ between the semantic projection of the first context σ and the semantic projection of each other context σ' of contexts 122, and then selecting one or more contexts σ' which are associated with similarities that exceed a predetermined threshold.

A rating prediction is determined at 550. The rating prediction is a prediction for the first user to the first resource in the first context. In some embodiments, the rating prediction is determined based on a rating given by the user to the first resource in the first context, a number of times the first resource has been suggested to the first user, and a number of times the first resource has been suggested to the first user in the one or more contexts determined at 540.

Stated symbolically:

$$P(U, R, \sigma) = \frac{1}{|S(\sigma, U)|} \sum_{\sigma' \in S(\sigma,U)} sim_{context}(\sigma, \sigma') \cdot r(U, R, \sigma),$$

where $P(U, R, \sigma)$ is the rating prediction, $r(U, R, \sigma)$ is the rating given (explicitly or implicitly) by the user to the first resource in the first context, and $S(\sigma, U)$ is the set of contexts associated with the user U and similar to the first context σ.

Continuing with the above example including semantic projections $S_1$-$S_5$, it will be assumed that in the past context $S_2$, the user U assigned an implicit rating of 5/5 to the resource R. Accordingly, $P(U, R, S_1)$ may then be determined as:

$$\frac{1}{|S(S_1, U)|} \sum_{\sigma' \in S(\sigma,U)} sim_{context}(S_1, \sigma') \cdot r(U, R, S_1) =$$

$$\frac{1}{1} \cdot (0.323839 \cdot 5) = 1.619195$$

A rating prediction is determined at 560 for each of the one or more similar users determined at 530. As described above with respect to 550, the rating prediction is a prediction for a user to the first resource in the first context. Generally, 560 may consist of determining $P(U, R, \sigma)$ as described above for each similar user U'. Accordingly, the rating predictions may be determined based on a rating given by a user to the first resource in the first context, a number of times the first resource has been suggested to the user, and a number of times the first resource has been suggested to the user in the one or more contexts determined at 540.

An interest measure associated with the first user, the first resource and the first context is determined at 570. The interest measure may be based on the rating prediction determined at 550, the semantic interest determined at 520, and an average of the rating predictions determined at 560. This average may be denoted as a community rating prediction $P_{comm}(U, R, \sigma)$. Therefore, as set forth above, the interest measure $I(U, R, \sigma)$ may be determined as:

$$I(U, R, \sigma) = f(I_{sem}(U, R, \sigma), P(U, R, \sigma), P_{comm}(U, R, \sigma)),$$

where $P_{comm}(U, R, \sigma) = \frac{1}{|comm(U)|} \sum_{U' \in comm(U)} sim_{user}(U, U') \cdot P(U', R, \sigma)$ According to some embodiments of 470, $$I(U, R, \sigma) = \left(\frac{2}{3} \cdot I_{sem}(U, R, \sigma) + \frac{1}{3} \cdot P_{comm}(U, R, \sigma)\right) \cdot P(U, R, \sigma)$$

Any other function based on $I_{sem}(U, R, \sigma)$, $P(U, R, \sigma)$ and $P_{comm}(U, R, \sigma)$ may be employed to determine the interest measure $I(U, R, \sigma)$ at 570. As also described above, some embodiments of 570 may omit the community rating prediction $P_{comm}(U, R, \sigma)$ from the determination of the interest measure $I(U, R, \sigma)$, leaving:

$$I(U,R,\sigma) = f(I_{sem}(U,R,\sigma), P(U,R,\sigma))$$

These embodiments may therefore omit the determinations at 530 and 560, which are used to determine the community rating prediction $P_{comm}(U, R, \sigma)$.

Figure 8:
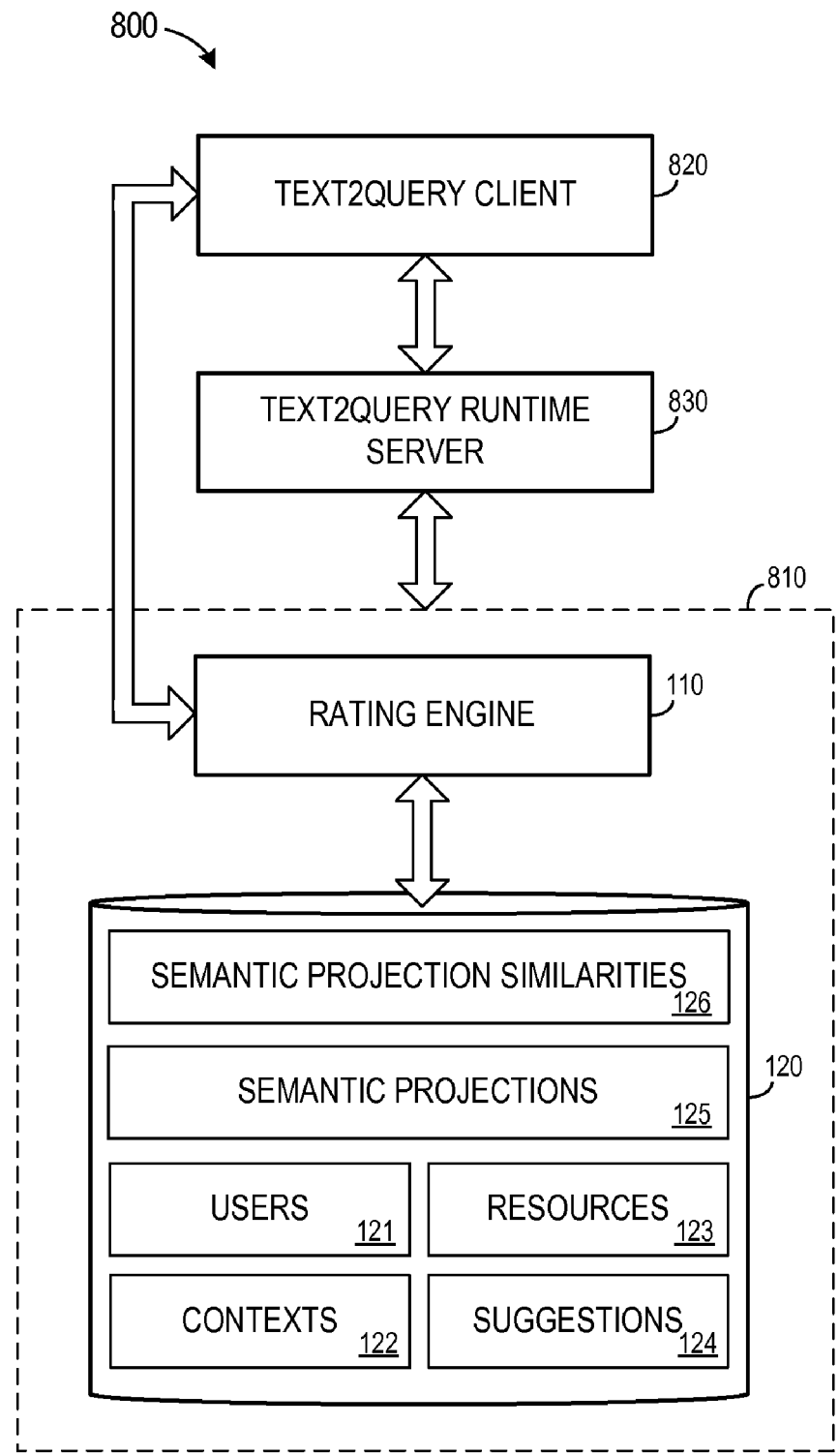
FIG. 8 is a block diagram of a system according to some embodiments.

FIG. 8 is a block diagram of system 800 according to some embodiments. System 800 is intended to illustrate one use of a system according to some embodiments. Rating system 810 comprises rating engine 110 and data storage device 120 as described with respect to FIG. 1. System 800 provides rating system 810 in conjunction with a "Text2 Query" system such as that described in commonly-assigned co-pending U.S. patent application Ser. No. 12/463,757.

For example, Text2 Query client 820 initially provides a text string to Text2 Query runtime server 830. The text string may originate from an eMail, a document, or any other source. Runtime server 830 is expected to generate database queries based on the text string and return the database queries to client 820.

Runtime server 830 processes the text string and builds a first list of suggested database queries and forwards the list to rating system 810. Rating system 810 considers each query in the list as a resource, and determines an interest measure for each resource according to any of the processes described herein. The determined interest measures are used to filter and re-order the list of suggested database queries, and the re-ordered list is sent back to runtime server 830. Runtime server 830 may forward the list to client 820, through which the user may explicitly rate the queries.

Implicit ratings may be captured by noting actions of the user with respect to the queries. For example, client 820 may allow the user to select a query from the re-ordered list to get a corresponding chart preview. Since this action is a sign of interest from the user, an implicit rating (e.g., 3/5) may be assigned to the query. If the user then chooses to retrieve the complete chart and use the chart within another application, the implicit rating may be updated (e.g., to 5/5).

Embodiments described herein are solely for the purpose of illustration. Those in the art will recognize other embodiments may be practiced with modifications and alterations to that described above.

What is claimed is:

1. A system comprising:
a storage device to store a respective semantic projection for each of a plurality of resources, for each of a plurality of sets of user interests and for each of a plurality of user contexts, each respective semantic projection conforming to a common semantic projection model; and
a processor to:
determine a similarity of a semantic projection of a set of interests of a first user to a semantic projection of a first resource includes:
determination of a similarity of a semantic projection of a set of static interests associated with the first user to the semantic projection of the first resource;
determination of a similarity of a semantic projection of a set of dynamic interests associated with the first user and a first context to the semantic projection of the resource, and
wherein the determination of the semantic interest of the first user for the first resource in the first context is based on the similarity of the semantic projection of the set of static interests associated with the first user to the semantic projection of the resource, and on the similarity of the semantic projection of the set of dynamic interests associated with the first user and the first context to the semantic projection of the resource;
determine a semantic interest of the first user for the first resource in the first context based on the similarity of the semantic projection of the set of the interests of the first user to the semantic projection of the first resource; and
determine an interest measure associated with the first user, the first resource and the first context based on a rating prediction for the first user to the first resource in the first context and on the determined semantic interest of the first user for the first resource in the first context.

2. A system according to claim 1, the processor further to:
determine one or more contexts similar to the first context based on a similarity between the semantic projection of the first context and respective one or more semantic projections of the one or more contexts; and
determine the rating prediction for the first user to the first resource in the first context based on a rating given by the first user to the first resource in the first context, a number of times the first resource has been suggested to the first user, and a number of times the first resource has been suggested to the first user in the one or more contexts similar to the first context.

3. A system according to claim 2, the processor further to:
determine one or more users similar to the first user based on a similarity between the semantic projection of the first user and respective one or more semantic projections of the one or more users,
wherein determination of the interest measure is based on the rating prediction for the first user to the first resource in the first context, on the determined semantic interest of the first user for the first resource in the first context, and on an average rating prediction for the one or more users to the first resource in the first context.

4. A system according to claim 1, the processor further to:
determine one or more users similar to the first user based on a similarity between the semantic projection of the first user and respective one or more semantic projections of the one or more users,
wherein determination of the interest measure is based on the rating prediction for the first user to the first resource in the first context, on the determined semantic interest of the first user for the first resource in the first context, and on an average rating prediction for the one or more users to the first resource in the first context.

5. A system according to claim 1, the processor further to:
determine one or more users similar to the first user based on a similarity between the semantic projection of the first user and respective one or more semantic projections of the one or more users,
wherein determination of the interest measure is based on the rating prediction for the first user to the first resource in the first context, on the determined semantic interest of the first user for the first resource in the first context, and on an average rating prediction for the one or more users to the first resource in the first context.

6. A system according to claim 1, wherein determination of the similarity of the semantic projection of the set of the interests of the first user to the semantic projection of the first resource comprises:
association of respective weights with each of first concepts of the semantic projection of the set of the interests of the first user based on the respective depths of each of the first concepts in the common semantic projection model;
association of respective weights with each of second concepts of the semantic projection of the first resource based on the respective depths of each of the second concepts in the common semantic projection model; and
determination of the similarity of the semantic projection of the set of the interests of the first user to the semantic projection of the first resource based on the respective weights of each of the first concepts and the respective weights of each of the second concepts.

7. A system according to claim 6, wherein determination of the similarity of the semantic projection of the set of the interests of the first user to the semantic projection of the first resource comprises:
association of respective coefficients of explicitness with each of the first concepts of the semantic projection of the set of the interests of the first user based on whether each one of the first concepts is explicitly referenced;
association of respective coefficients of explicitness with each of the second concepts of the semantic projection of the first resource based on whether each one of the second concepts is explicitly referenced; and
determination of the similarity of the semantic projection of the set of the interests of the first user to the semantic projection of the first resource based on the respective weights and respective coefficients of explicitness of the first concepts and the respective weights and respective coefficients of explicitness of the second concepts.

8. A system according to claim 1, wherein determination of the similarity of the semantic projection of the set of the interests of the first user to the semantic projection of the first resource comprises:
determination of a first branch of the semantic projection of the set of interests of the first user and a second branch of the semantic projection of the first resource which is comparable to the first branch;
determination of a first one or more sub-trees for the first branch, the first one or more sub-trees comprising first explicit concepts and parent concepts thereof;

determination of a second one or more sub-trees for the second branch, the second one or more sub-trees comprising second explicit concepts and parent concepts thereof; and determination of a similarity between the first branch and the second branch based on a weighted average of a proximity of weights of concepts of the first one or more sub-trees and weights of corresponding concepts of the second one or more sub-trees.

9. A computer-implemented method comprising:

determining a similarity of a semantic projection of a set of interests of a first user to a semantic projection of a first resource, wherein the semantic projection of the set of interests of the first user and the semantic projection of the first resource conforms to a common semantic projection model, the determination including:

determining a similarity of a semantic projection of a set of static interests associated with the first user to the semantic projection of the first resource; and determining a similarity of a semantic projection of a set of dynamic interests associated with the first user and a first context to the semantic projection of the resource;

wherein the determination of the semantic interest of the first user for the first resource in the first context is based on the similarity of the semantic projection of the set of static interests associated with the first user to the semantic projection of the resource, and on the similarity of the semantic projection of the set of dynamic interests associated with the first user and the first context to the semantic projection of the resource;

determining a semantic interest of the first user for the first resource in the first context based on the similarity of the semantic projection of the set of the interests of the first user to the semantic projection of the first resource; and determining an interest measure associated with the first user, the first resource and the first context based on a rating prediction for the first user to the first resource in the first context and on the determined semantic interest of the first user for the first resource in the first context.

10. A computer-implemented method according to claim 9, further comprising:

determining one or more contexts similar to the first context based on a similarity between the semantic projection of the first context and respective one or more semantic projections of the one or more contexts; and determining the rating prediction for the first user to the first resource in the first context based on a rating given by the first user to the first resource in the first context, a number of times the first resource has been suggested to the first user, and a number of times the first resource has been suggested to the first user in the one or more contexts similar to the first context.

11. A computer-implemented method according to claim 10, further comprising:

determining one or more users similar to the first user based on a similarity between the semantic projection of the first user and respective one or more semantic projections of the one or more users, wherein determination of the interest measure is based on the rating prediction for the first user to the first resource in the first context, on the determined semantic interest of the first user for the first resource in the first context, and on an average rating prediction for the one or more users to the first resource in the first context.

12. A computer-implemented method according to claim 9, further comprising:

determining one or more users similar to the first user based on a similarity between the semantic projection of the first user and respective one or more semantic projections of the one or more users, wherein determination of the interest measure is based on the rating prediction for the first user to the first resource in the first context, on the determined semantic interest of the first user for the first resource in the first context, and on an average rating prediction for the one or more users to the first resource in the first context.

13. A computer-implemented method according to claim 9, further comprising:

determining one or more users similar to the first user based on a similarity between the semantic projection of the first user and respective one or more semantic projections of the one or more users, wherein determination of the interest measure is based on the rating prediction for the first user to the first resource in the first context, on the determined semantic interest of the first user for the first resource in the first context, and on an average rating prediction for the one or more users to the first resource in the first context.

14. A computer-implemented method according to claim 9, wherein determination of the similarity of the semantic projection of the set of the interests of the first user to the semantic projection of the first resource comprises:

associating respective weights with each of first concepts of the semantic projection of the set of the interests of the first user based on the respective depths of each of the first concepts in the common semantic projection model;

associating respective weights with each of second concepts of the semantic projection of the first resource based on the respective depths of each of the second concepts in the common semantic projection model; and determining the similarity of the semantic projection of the set of the interests of the first user to the semantic projection of the first resource based on the respective weights of each of the first concepts and the respective weights of each of the second concepts.

15. A computer-implemented method according to claim 14, wherein determination of the similarity of the semantic projection of the set of the interests of the first user to the semantic projection of the first resource comprises:

associating respective coefficients of explicitness with each of the first concepts of the semantic projection of the set of the interests of the first user based on whether each one of the first concepts is explicitly referenced;

associating respective coefficients of explicitness with each of the second concepts of the semantic projection of the first resource based on whether each one of the second concepts is explicitly referenced; and determining the similarity of the semantic projection of the set of the interests of the first user to the semantic projection of the first resource based on the respective weights and respective coefficients of explicitness of the first concepts and the respective weights and respective coefficients of explicitness of the second concepts.

16. A computer-implemented method according to claim 9, wherein determination of the similarity of the semantic projection of the set of the interests of the first user to the semantic projection of the first resource comprises:

determining a first branch of the semantic projection of the set of interests of the first user and a second branch of the semantic projection of the first resource which is comparable to the first branch;

determining a first one or more sub-trees for the first branch, the first one or more sub-trees comprising first explicit concepts and parent concepts thereof;

determining a second one or more sub-trees for the second branch, the second one or more sub-trees comprising second explicit concepts and parent concepts thereof; and determining a similarity between the first branch and the second branch based on a weighted average of a proximity of weights of concepts of the first one or more sub-trees and weights of corresponding concepts of the second one or more sub-trees.

* * * * *